United States Patent
Zhang

(10) Patent No.: US 8,433,021 B2
(45) Date of Patent: Apr. 30, 2013

(54) DETERMINING SYMBOL SYNCHRONIZATION INFORMATION FOR OFDM SIGNALS

(75) Inventor: Junling Zhang, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 800 days.

(21) Appl. No.: 12/445,309

(22) PCT Filed: Oct. 12, 2007

(86) PCT No.: PCT/IB2007/054150
§ 371 (c)(1),
(2), (4) Date: Apr. 13, 2009

(87) PCT Pub. No.: WO2008/047277
PCT Pub. Date: Apr. 24, 2008

(65) Prior Publication Data
US 2010/0014602 A1 Jan. 21, 2010

(30) Foreign Application Priority Data
Oct. 16, 2006 (CN) .......................... 2006 1 0137329

(51) Int. Cl.
*H04L 7/00* (2006.01)
(52) U.S. Cl.
USPC ........................... 375/355; 375/260; 375/343
(58) Field of Classification Search .................. 375/260, 375/267, 343, 354, 355
See application file for complete search history.

(56) References Cited

U.S. PATENT DOCUMENTS

| | | | |
|---|---|---|---|
| 5,812,523 A * | 9/1998 | Isaksson et al. | 370/208 |
| 5,991,289 A * | 11/1999 | Huang et al. | 370/350 |
| 6,192,056 B1 * | 2/2001 | Tsuruoka | 370/504 |
| 2003/0026360 A1 | 2/2003 | Ramasubramanian et al. | |
| 2006/0115025 A1 | 6/2006 | Kim et al. | |
| 2006/0126670 A1 | 6/2006 | Jeon et al. | |

FOREIGN PATENT DOCUMENTS

| | | |
|---|---|---|
| EP | 0901260 A2 | 3/1999 |
| EP | 1469647 A1 | 10/2004 |
| GB | 2353681 A | 2/2001 |
| WO | 2005109654 A1 | 11/2005 |

OTHER PUBLICATIONS

Arto Palin et al; "Enhanced Symbol Synchronization Method for OFDM System in SFN Channels", IEEE GOLBECOM 1998, The Bridge to Global Integration, Sydney, Nov. 8-12, 1998, New York, NY, IEEE, US, vol. 5, pp. 2788-2793, XP000801552.

Jan-Jaap Van De Beek et al; "Low-Complex Frame Synchronization in OFDM Systems", 1995 Fourth IEE Intl Conf. on Universal Personal Communications Record, Gateway to the 21st, Century, Tokyo, Nov. 6, 1995, New York, NY, US, vol. Conf. 4, pp. 982-986, XP010160687.

* cited by examiner

*Primary Examiner* — David B. Lugo

(57) ABSTRACT

The invention provides a method of detecting symbol synchronization information for an OFDM signal, the OFDM signal comprising at least one OFDM symbol and corresponding GI, the method comprising steps of: generating a correlated signal based on each OFDM symbol and its corresponding GI; processing the correlated signal to generate a first conditional signal comprising at least two local peaks; converting the first conditional signal into a second conditional signal comprising a global peak; and detecting the global peak to obtain the symbol synchronization information. The converting step further comprises delaying the first conditional signal by a predefined delay, and generating the second conditional signal by subtracting the delayed first conditional signal from the first conditional signal. With the method provided in the invention, detection of symbol synchronization information for an OFDM signal based on GI may be provided with improved precision, without being limited by the channel spread for the propagation channel.

23 Claims, 11 Drawing Sheets

DETERMINING SYMBOL SYNCHRONIZATION INFORMATION FOR OFDM SIGNALS

FIELD OF THE INVENTION

The invention relates generally to OFDM (Orthogonal Frequency Division Multiplexing) systems, and more particularly, to a method and apparatus of obtaining symbol synchronization information for OFDM signals based on GI (Guard Interval).

BACKGROUND OF THE INVENTION

Due to desirable advantages in higher transmission rate, resistance to multi-path interferences and so on, the OFDM (Orthogonal Frequency Division Multiplexing) technology is chosen as the modulation scheme for some digital broadcast systems, for example, DAB (Digital Audio Broadcasting) and DVB-T (Digital Terrestrial Video Broadcasting) systems. Typically, an OFDM signal comprises one or more OFDM symbols. To suppress ISI (Inter-Symbol Interference) suffering from multi-path propagation, a method based on GI (Guard Interval) may be employed, that is, to insert a GI having a certain duration before each OFDM symbol and copy the last portion of the OFDM symbol to form the content of the GI.

In a paper entitled "Low-complex Frame Synchronization In OFDM System" by J-J. van De Beek, M. Sandell, M. Isaksson, and P. O. Borjesson, Proceeding of ICUPC'95, Tokyo, 1995, pp. 982-986, J-J. van De Beek et al proposed a method of detecting symbol synchronization information for an OFDM signal by using the GI. FIG. 1 is a block diagram showing a receiver implemented in accordance with the method of detecting symbol synchronization information for an OFDM signal with GI as proposed by J-J. van De Beek et al. As shown, the receiver 100 comprises a correlator 110, a moving sum unit 120, an absolute value calculator 130 and a detector 140. The correlator 110 comprises a delayer 112, a conjugate calculator 114 and a convolver 116.

In environments where a large channel spread exists, for example, an SFN (Single Frequency Network) defined in the Nordig specification and a channel with 0-DB echo, it will be hard to detect symbol synchronization with the method proposed by J-J. van De Beek et al. In a paper entitled "Enhanced Symbol Synchronization Method for OFDM system in SFN Channels," by Arto Palin and Jukka Rinne, GLOBECOM'98, Vol. 5, November 1998, pp. 2788~2793, Arto Palin and Jukka Rinne presented the reasons for that. For the purpose of understanding, the reasons are simplified as follows.

FIG. 2 is a diagram schematically illustrating the impulse response for a channel with a large channel spread. In FIG. 2, a first multi-path signal $\delta(n)$ arrives at instant 0, and another multi-path signal $\delta(n-\tau)$ arrives at instant $\tau$, where $\tau$ may have a large value. For example, in an SFN channel defined by version 1.0.2 of the Nordig specification, $\tau$ has a range of $[1.95 \, \mu s, 0.95^*D_{GI}]$, where $D_{GI}$ is the duration of the GI. Table.1 lists some typical values for the GI defined in the Nordig specification.

TABLE 1

Typical values for the GI

| Size of FFT | Duration of GI (μs) | The protected channel spread (μs) |
|---|---|---|
| 2K FFT, GI = 1/32 | 7.0 | 1.95~6.65 |
| 2K FFT, GI = 1/16 | 14.0 | 1.95~13.3 |
| 2K FFT, GI = 1/8 | 28.0 | 1.95~26.6 |
| 2K FFT, GI = 1/4 | 56.0 | 1.95~53.2 |
| 8K FFT, GI = 1/32 | 28.0 | 1.95~26.6 |
| 8K FFT, GI = 1/16 | 56.0 | 1.95~53.2 |
| 8K FFT, GI = 1/8 | 112.0 | 1.95~106.4 |
| 8K FFT, GI = 1/4 | 224.0 | 1.95~212.8 |

FIG. 3 shows a process for forming a correlation signal after propagation through a channel with a large channel spread as shown in FIG. 2 with the method proposed by J-J. van De Beek et al. As shown, signal r(n) is a signal received via the first multi-path, or a signal generated by convolving the transmitted signal with the first multi-path signal $\delta(n)$; while signal r(n−τ) is a signal received via another multi-path, or the received signal generated by convolving the transmitted signal with $\delta(n-\tau)$. Signals r(n) and r(n−τ) are superimposed together to form the received signal received at the receiver. Illustratively, it can be seen that signal r(n) contains a GI and an OFDM symbol x(n), wherein the GI has the same length and content as the last portion of x(n). Signals r(n−N) and r(n−τ−N) may be obtained at a delayer 112, where N is generally the duration of an OFDM symbol and may be regarded as the size of IFFT (Inverse Fast Fourier Transform) performed at the corresponding OFDM transmitter. After correlating and moving summing signals r(n) and r(n−N), and calculating the absolute value for the real component of each sample, a correlation signal $C_0(n)$ may be obtained. After correlating and moving summing signals r(n−τ) and r(n−τ−N), and calculating the absolute value for the real component of each sample, a correlation signal $C_\tau(n)$ may be obtained. The correlation signals $C_0(n)$ and $C_\tau(n)$ each have a peak. For a correlation signal having only one global peak, the detector generally may obtain the starting point of symbol synchronization by detecting the peak of the correlation signal. However, signals r(n) and r(n−τ) are superimposed, which causes the addition of the correlation signals $C_0(n)$ and $C_\tau(n)$, to form a combined correlation signal $C_{0+\tau}(n)$. For ease of understanding, it's assumed here that the channel has no interference, so the correlation signals $C_0(n)$ and $C_\tau(n)$ have an ideal triangle, which causes the combined correlation signal $C_{0+\tau}(n)$ obtained by addition to not have the only peak any more, but have a platform having a certain length and the only value, whose starting point and ending point have the same positions as the peaks of the correlation signals $C_0(n)$ and $C_\tau(n)$, respectively. In a practical system, however, due to the existence of interferences, the correlation signal $C_{0+\tau}(n)$ may have multiple small sharp peaks, i.e., local peaks, instead of a platform having a certain length and the only value. For this reason, it is difficult for the detector to detect the synchronization point precisely, and hence it becomes hard or even impossible to achieve symbol synchronization.

To solve this problem, A. Palin and J. Rinne proposed a method for double correlation, as shown in FIG. 4. In a receiver 400 implementing the double correlation method, a second correlator 430 and a second moving sum unit 440 are inserted after a first correlator 410 and a first moving sum unit 420 and before an absolute value calculator 450. The second correlator 430 comprises a delayer 432, a conjugate calculator 434 and a convolver 436, where the delayer 432 delays the input signal of the second correlator 430 by (N+L) samples.

After two correlations and moving sums, conventional peak detection methods may be used to detect the symbol synchronization point.

The double correlation method may reduce influences from noises and interferences. However, as admitted in the paper entitled "Enhanced Symbol Synchronization Method for OFDM system in SFN Channels", the double correlation method only applies to channels whose channel spread is less than or equal to half the length of the GI.

It is, therefore, necessary to provide a method to enable precise detection of symbol synchronization information for an OFDM signal based on GI, without being limited by the channel spread for the propagation channel.

SUMMARY OF THE INVENTION

It's advantage to provide a method and apparatus to enable precise detection of symbol synchronization information for an OFDM signal based on GI.

Another advantage is to provide a method and apparatus to estimate the channel spread for a propagation channel.

According to one embodiment of the invention, an apparatus for determining symbol synchronization information for an OFDM signal is provided, wherein the OFDM signal comprising at least an OFDM symbol and a GI corresponding to the OFDM symbol, the apparatus comprising: a correlator, configured to generate a correlation signal based on each OFDM symbol and its corresponding GI; a peak signal generator, configured to process the correlation signal to generate a first conditional signal comprising at least two local peaks; a converter, configured to convert the first conditional signal into a second conditional signal comprising a global peak; and a detector, configured to detect the global peak to obtain the symbol synchronization information corresponding to the global peak.

Wherein, the converter comprises: a delayer, configured to delay the first conditional signal by a predefined delay; and a subtracter, configured to subtract the delayed first conditional signal from the first conditional signal to generate the second conditional signal.

The predefined delay should have such a length that the corresponding global peak obtained by delaying and subtraction operations is not less than a predefined threshold, so as to allow the detector to detect the global peak.

Optionally, the predefined delay and the GI have lengths which satisfy a preset length relationship. Preferably, the predefined delay and the GI have equal length.

Optionally, the second conditional signal further includes a global minimum and the detector may be further configured to detect the global minimum. The apparatus further comprises a channel spread calculator, configured to subtract the length of the predefined delay from the time interval between the global peak and the global minimum, so as to calculate the channel spread for the channel over which the OFDM signal is propagated.

according to an embodiment of the invention, a method for determining symbol synchronization information for an OFDM signal is provided, wherein the OFDM signal comprising at least an OFDM symbol and a GI corresponding to the OFDM symbol, the method comprising steps of: generating a correlation signal based on each OFDM symbol and its corresponding GI; processing the correlation signal to generate a first conditional signal comprising at least two local peaks; converting the first conditional signal into a second conditional signal comprising a global peak; and detecting the global peak to obtain the symbol synchronization information corresponding to the global peak.

Wherein, the converting step further comprises steps of: delaying the first conditional signal by a predefined delay; and subtracting the delayed first conditional signal from the first conditional signal to generate the second conditional signal.

Optionally, the predefined delay and the GI have equal length.

Optionally, the method further comprises steps of: detecting a global minimum from the second conditional signal; and subtracting the length of the predefined delay from the time interval between the global peak and the global minimum, so as to calculate the channel spread for a corresponding channel.

As discussed above, using the method proposed by J-J. van De Beek et al, it is difficult to detect symbol synchronization precisely in a case where the channel has a large channel spread; while using the double correlation method proposed by Arto Palin and Jukka Rinne, it is difficult to detect symbol synchronization precisely in a case where the channel spread is more than half the length of the GI. In contrast, the method and apparatus provided in each embodiment of the invention may sufficiently improve the precision for detection of symbol synchronization information, without being limited by the channel spread for the propagation channel.

With the method and apparatus provided in some embodiments of the invention, the channel spread for a channel may be estimated easily, as well.

Other objects and attainments together with a fuller understanding of the invention will become apparent and appreciated by referring to the following descriptions and claims taken in conjunction with the accompanying drawings.

BRIEF DESCRIPTION OF THE DRAWINGS

Throughout all the above drawings, like reference numerals will be understood to refer to like, similar or corresponding features or functions.

DETAILED DESCRIPTION OF THE INVENTION

Detailed descriptions will be made below to the method and apparatus of the invention with reference to specific embodiments and accompanying drawings.

Figure 1:
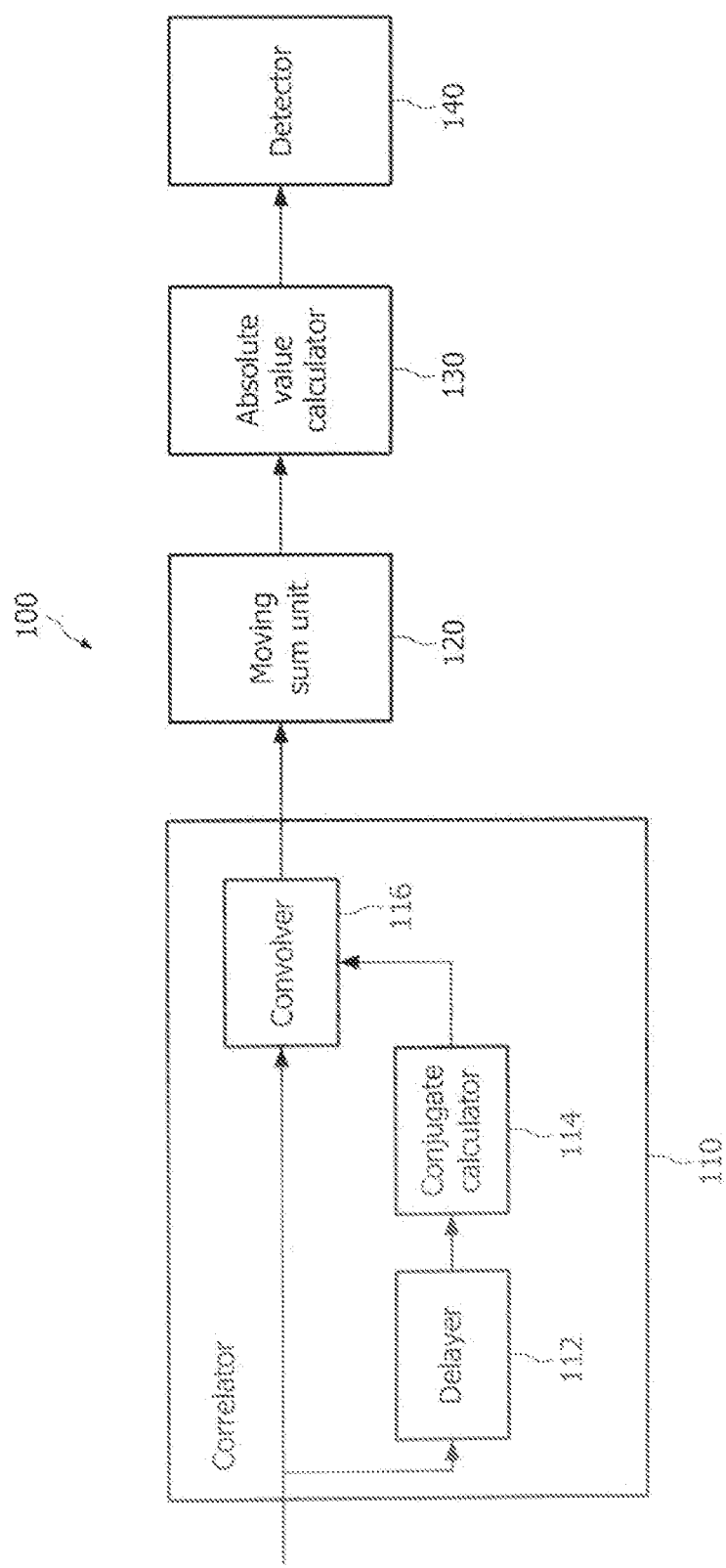
FIG. 1 is a block diagram showing a receiver implemented with the method of detecting symbol synchronization information with GI as proposed by J-J. van De Beek et al.
Figure 2:
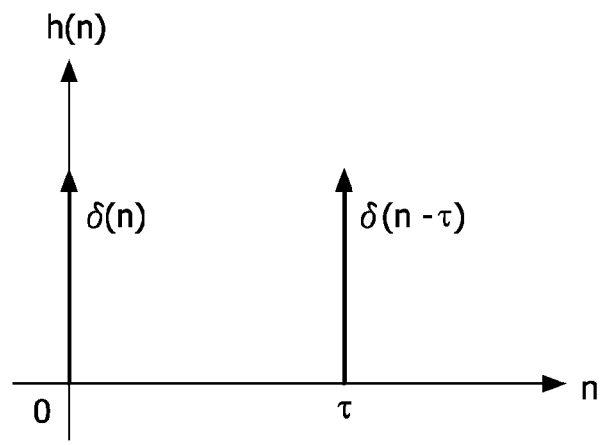
FIG. 2 is a diagram schematically illustrating the impulse response for a channel with a large channel spread.
Figure 3:
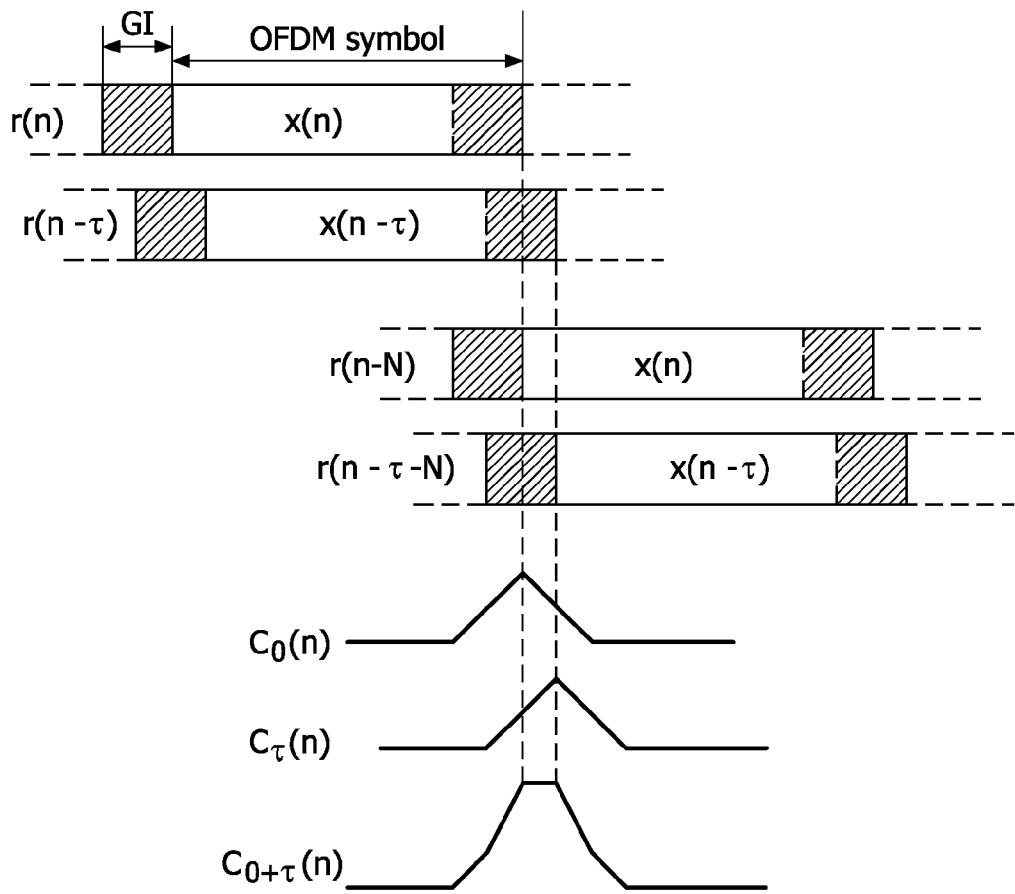
FIG. 3 shows a process for forming a correlation signal after propagation along a channel as shown in FIG. 2 with the method proposed by J-J. van De Beek et al.
Figure 4:
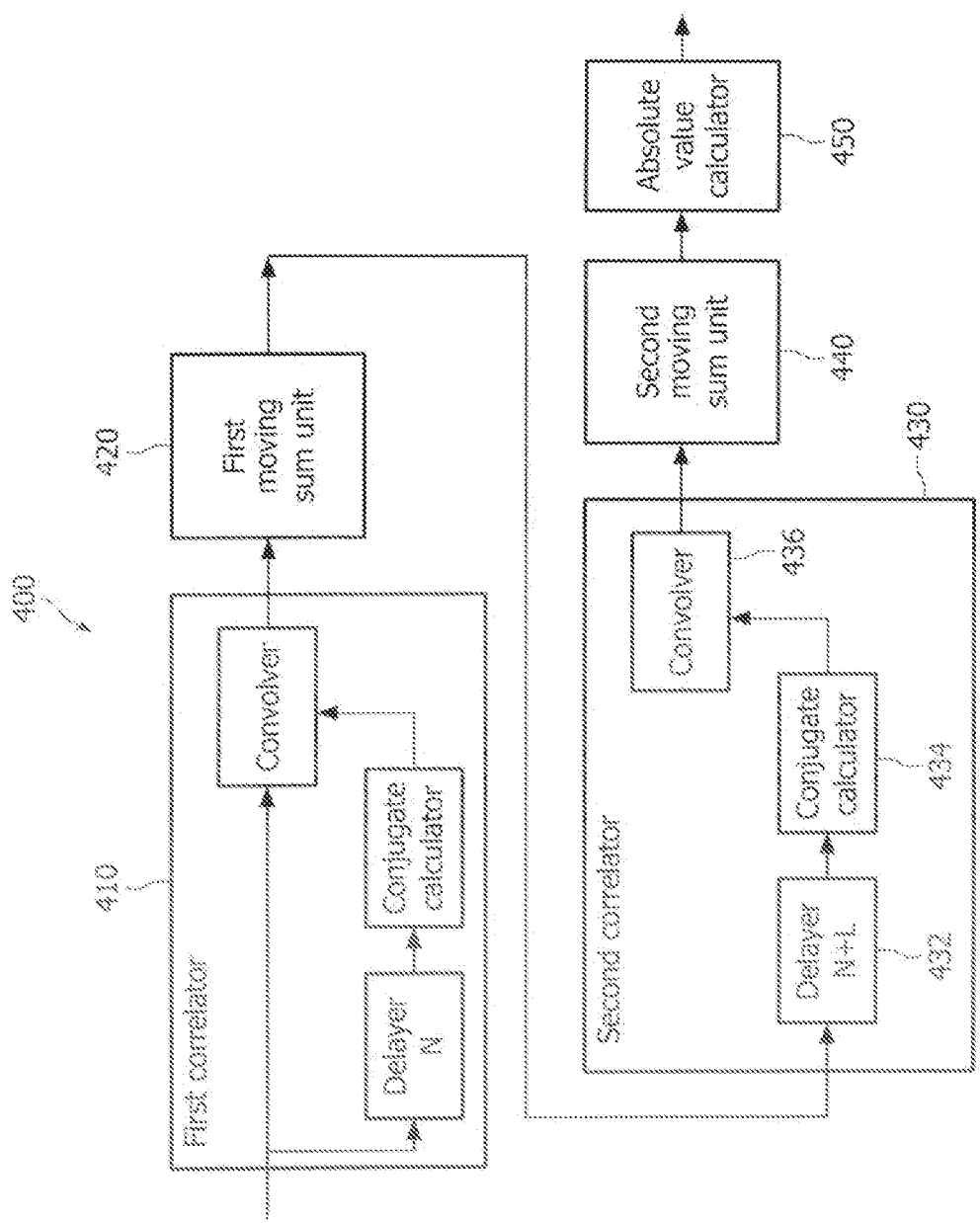
FIG. 4 is a block diagram showing a receiver implemented with the double correlation method.
Figure 5:
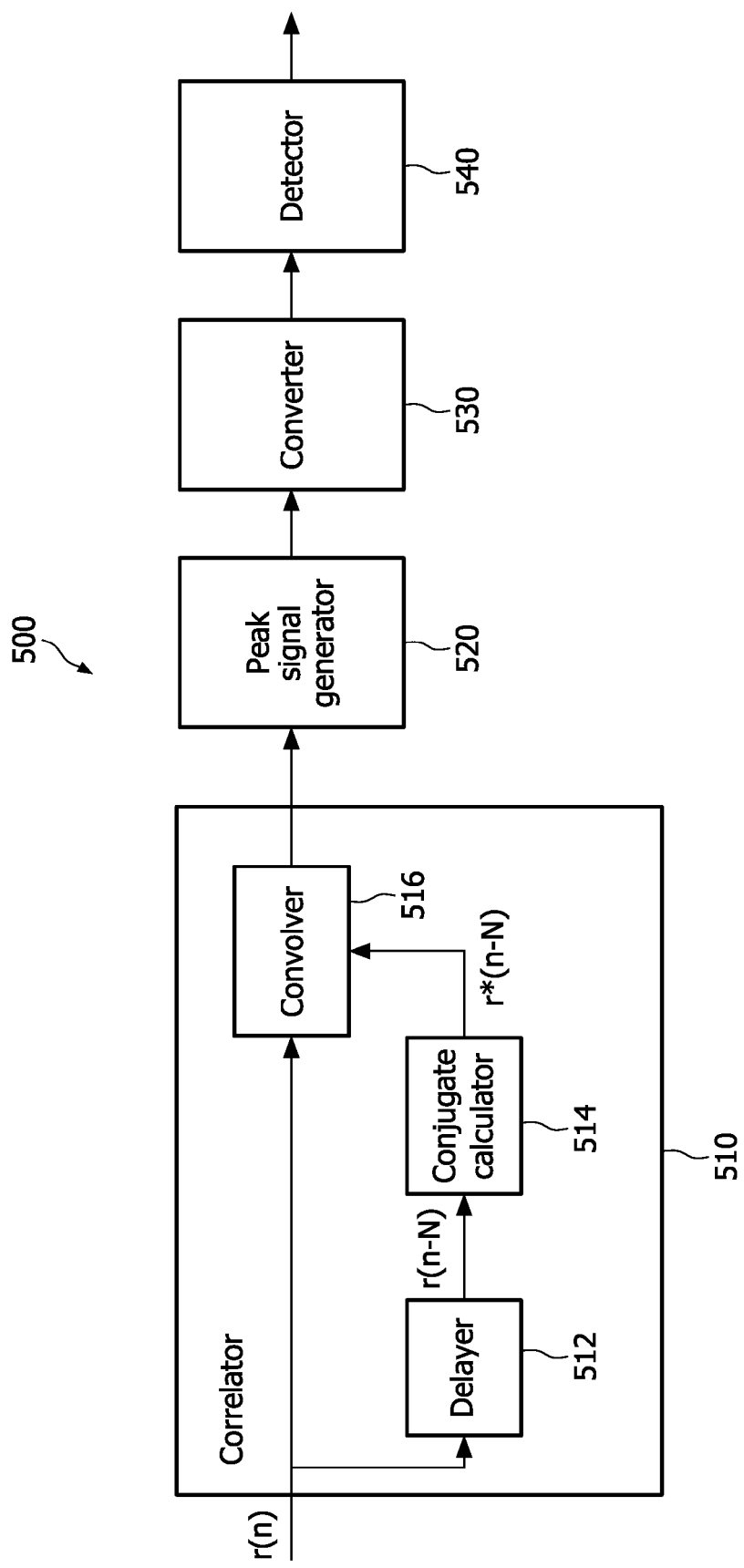
FIG. 5 is a block diagram showing a receiver implemented according to an embodiment of the invention.

To detect symbol synchronization information for an OFDM signal, FIG. 5 shows a block diagram for a receiver implemented according to an embodiment of the invention. The receiver 500 comprises a correlator 510, a peak signal generator 520, a converter 530 and a detector 540. Wherein, the correlator 510 is configured to generate a correlation signal based on an OFDM symbol and its corresponding GI; the peak signal generator 520 is configured to process the correlation signal to generate a first conditional signal comprising at least two local peaks; the converter 530 is configured to convert the first conditional signal into a second conditional signal comprising a global peak; and the detector 540 is configured to detect the global peak in the second conditional signal to obtain the symbol synchronization information.

Based on a fact that the GI and the corresponding portion of the OFDM symbol have the same length and content, the correlator 510 performs delaying and conjugation operations on the input OFDM signal to obtain two signals, and correlates the two signals to obtain a correlation signal.

In the embodiment shown in FIG. 5, the correlator 510 comprises a delayer 512, a conjugate calculator 514 and a convolver 516. The input signal r(n) passes a path to reach the convolver 516 directly. Meanwhile, the input signal r(n) passes the delayer 512 to obtain a delayed signal r(n−N), where N is the delay length of the delayer 512. Typically, N equals the size of IFFT (Inverse Fast Fourier Transform) performed at the OFDM transmitter, which aligns the samples in the GI and those in the corresponding portion of the OFDM symbol, so as to perform correlation. The conjugate calculator 514 processes the delayed signal r(n−N), to obtain a conjugate signal r*(n−N). The convolver 516 correlates signals r(n) and r*(n−N), to obtain a correlation signal.

Alternatively, the correlator 510 may be implemented in another manner. A delayer 512 and a conjugate calculator 514 are provided in two paths respectively, to obtain a delayed signal r(n−N) and a conjugate signal r*(n), on which the convolver 516 then performs correlation. Similarly, a correlation signal may also be obtained based on the GI and the OFDM symbol.

Figure 6A:
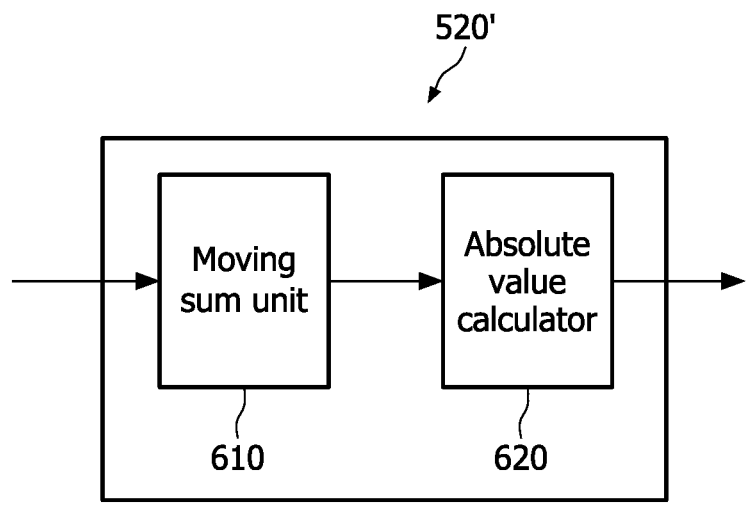
FIG. 6A is a block diagram showing a peak signal generator implemented according to an embodiment of the invention.

The basic idea of the peak signal generator 520 is processing the correlation signal outputted from the correlator, to obtain a signal having peaks, or the first conditional signal. Moving sum is a commonly used method. For ease of description, the operation of the peak signal generator 520 will be explained below with reference to moving sum. But those skilled in the art will appreciate that other methods for generating a signal having one or more peaks by processing a correlation signal are also possible for the invention. FIG. 6A is a block diagram showing a peak signal generator 520' implemented according to an embodiment of the invention. The peak signal generator 520' comprises a moving sum unit 610 and an absolute value calculator 620. The moving sum unit 610 is configured to perform moving sum on the correlation signal output from the correlator 510, to generate a moving sum conditional signal. The size for the moving widow of the moving sum is generally equal to the length L of the GI. The absolute value calculator 620 is configured to calculate the absolute value for the real component of each sample of the moving sum conditional signal, to obtain the first conditional signal. In the embodiment shown in FIG. 6A, the moving sum unit 610 sums the amplitudes of the correlation signal, and thus the value for each sample of the moving sum conditional signal and the first conditional signal reflects the accumulation for the amplitudes of samples of the correlation signal.

Figure 6B:
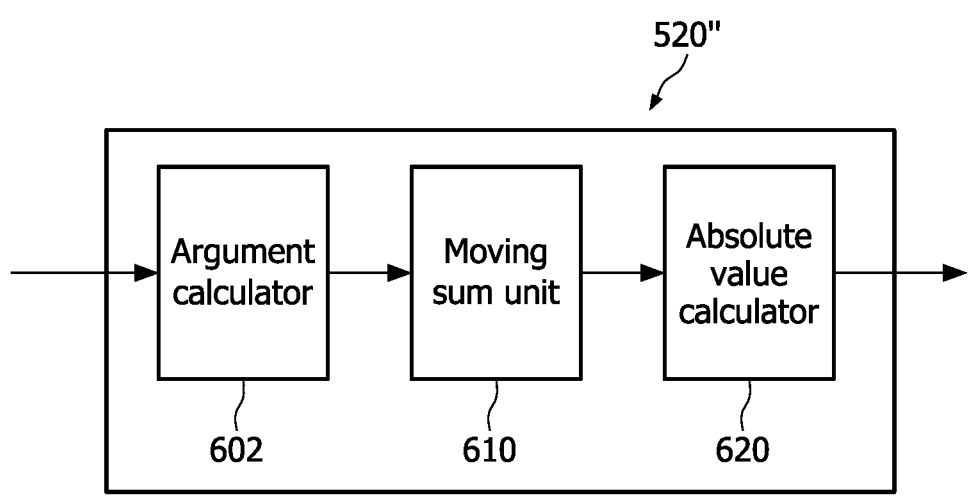
FIG. 6B is a block diagram showing a peak signal generator implemented according to another embodiment of the invention.

It is known that the phase information of the correlation signal may help to detect the synchronization information. FIG. 6B is a block diagram showing a peak signal generator 520" implemented according to another embodiment of the invention. The peak signal generator 520" comprises an argument calculator 602, a moving sum unit 610 and an absolute value calculator 620. The argument calculator 602 is configured to calculate the argument for each sample of the correlation signal. The moving sum unit 610 performs moving sum on the conditional signal containing argument information to obtain a moving sum conditional signal. And thus the value for each sample of the obtained first conditional signal reflects the accumulation for the arguments of samples of the correlation signal.

Figure 7A:
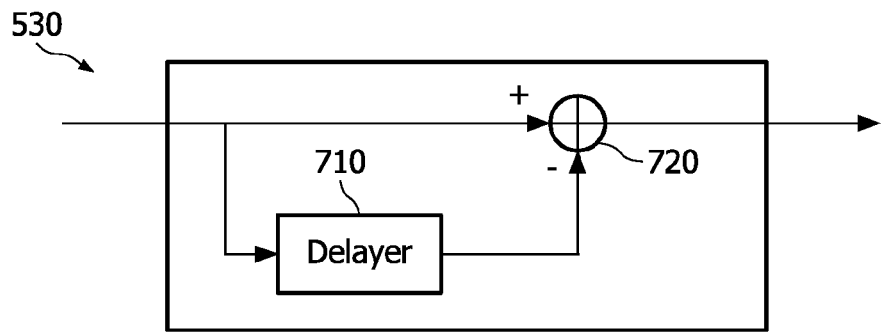
FIG. 7A is a block diagram showing a converter implemented according to an embodiment of the invention.

FIG. 7A is a block diagram showing a converter 530 implemented according to an embodiment of the invention. The converter 530 comprises a delayer 710 and a subtracter 720. The delayer 710 is configured to delay the input signal of the converter 530, that is, the first conditional signal, by a predefined delay, to obtain the delayed first conditional signal. The subtracter 720 is configured to generate the second conditional signal by subtracting the delayed first conditional signal from the first conditional signal. The main idea of the converter 530 is to generate an amplitude difference between the corresponding sampling points of the first conditional signal and the delayed first conditional signal by using a predefined delay, and then to obtain multiple sampling differences through subtraction. The basic criteria for setting the length of the predefined delay is such that only one of the multiple sampling differences obtained by subtraction has a global maximum, that is, the global peak, and the global peak should have a certain amplitude, that is, exceed a threshold such that the detector 540 can detect the global peak.

Figure 7B:
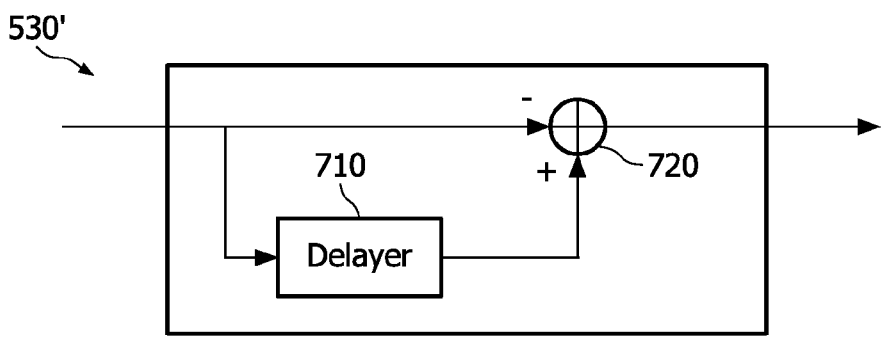
FIG. 7B is a block diagram showing a converter implemented according to another embodiment of the invention.

In FIG. 7A, the subtracter 720 subtracts the delayed first conditional signal from the first conditional signal, to obtain the second conditional signal having a global peak, or the global maximum. A subsequent detector 540 obtains the symbol synchronization information by detecting the global peak. Alternatively, another implementation of the converter 530' is shown in FIG. 7B. The subtracter 720 is configured to generate the second conditional signal having a global minimum by subtracting the first conditional signal from the delayed first conditional signal. Those skilled in the art will appreciate that the instant corresponding to the global minimum in this embodiment is same as that corresponding to the global maximum in the embodiment of FIG. 7A. In this way, the subsequent detector 540 may obtain the symbol synchronization information by detecting the global minimum. The two embodiments have equivalent methods and effects.

Through the delaying and subtraction of the converter 530, a first conditional signal having multiple local peaks may be converted into a second conditional signal having a global peak. The detector 540 detects the second conditional signal to find the global peak and the corresponding time information, so as to obtain the symbol synchronization information.

Figure 8:
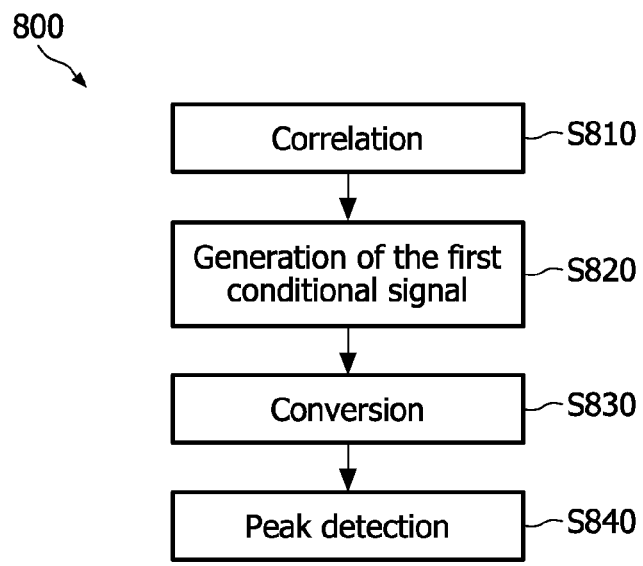
FIG. 8 is a flow chart illustrating a method for determining symbol synchronization information for an OFDM signal implemented according to an embodiment of the invention.

FIG. 8 is a flow chart 800 illustrating a method for determining symbol synchronization information for an OFDM signal implemented according to an embodiment of the invention. First at step S810, a correlation signal is generated based on an input signal; at step S820, the correlation signal is processed to generate a first conditional signal, which may have multiple local peaks; at step S830, the first conditional signal is converted into a second conditional signal having a global peak; and at step S840, symbol synchronization information is obtained by detecting the global peak.

Figure 9:
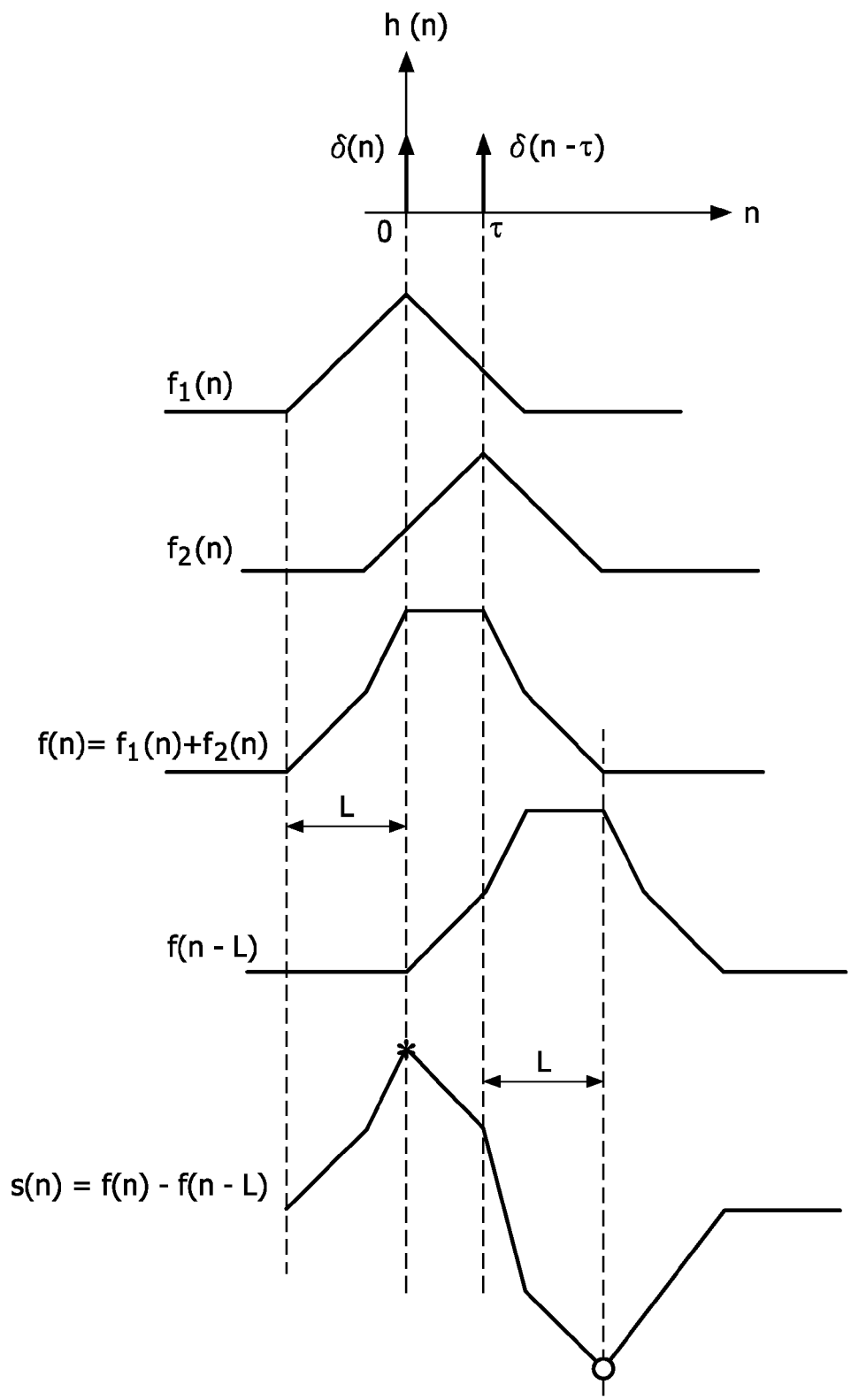
FIG. 9 shows a process for converting a first conditional signal comprising at least two local peaks into a second conditional signal comprising a global peak implemented according to an embodiment of the invention.

For a better understanding of the method and apparatus provided in the invention, detailed descriptions will be given below with reference to an embodiment to a process of detecting the symbol synchronization information with the method and apparatus provided in the invention, especially, a process of converting a first conditional signal having multiple local peaks into a second conditional signal having a global peak, as shown in FIG. 9.

In the embodiment of FIG. 9, the propagation channel is a multi-path channel having 0-DB echo, where the impulse response function for the first multi-path is $\delta(n)$, and the impulse response function for the path having 0-DB echo is $\delta(n-\tau)$. The value of $\tau$ falls within a wide range whose lower limit may approach 0 and upper limit may be more than the duration $D_{GI}$ of the GI, such as $(1.95 \mu s, 0.95 * D_{GI}]$ provided in the Nordig specification. It may be seen from the following description that the method and apparatus provided in the invention is applicable to channels whose $\tau$ is more than $0.5 * D_{GI}$, as well as channels whose $\tau$ is less than or equal to $0.5 * D_{GI}$.

Due to the existence of the 0-DB echo, the signal $r(n)$ received at the receiver may be given by $r(n)=x(n)+x(n-\tau)$, where $x(n)$ is the signal received via the first multi-path, and $x(n-\tau)$ is the signal received via the path corresponding to the 0-DB echo. The signal $x(n)$ is processed at the correlator and the peak generator to produce the signal $f_1(n)$; the signal $x(n-\tau)$ is processed at the correlator and the peak generator to produce the signal $f_2(n)$. It can be seen that $f_1(n)$ and $f_2(n)$ both have the only peak. Due to superimposition, the input signal of the converter is virtually a signal having a platform of a certain width, that is, the first conditional signal $f(n)$, $f(n)=f_1(n)+f_2(n)$.

A path of the first conditional signal $f(n)$ reaches the subtracter via the straight line shown in the embodiment of FIG. 7. Another path of the first conditional signal $f(n)$ passes the delayer shown in the embodiment of FIG. 7 to change to $f(n-L)$ and then reaches the subtracter. The subtracter performs subtraction to obtain the second conditional signal $s(n)=f(n)-f(n-L)$. It can be seen that the second conditional signal $s(n)$ has a global peak, as indicated by the * mark. It may be seen that the instant corresponding to the global peak is same as that corresponding to the peak of the first conditional signal $f(n)$. So, the detector may obtain the time information for symbol synchronization precisely by detecting the second conditional signal $s(n)$. For ease of illustration, the input signals $x(n)$ and $x(n-\tau)$ pass the correlator and the peak signal generator to produce signals $f_1(n)$ and $f_2(n)$, both of which are standard triangle function. But those skilled in the art will appreciate that even if signals $f_1(n)$ and $f_2(n)$ are not standard triangle functions due to noises, interferences, and errors resulting from the correlator and the peak signal generator, the instant corresponding to the global peak of the second conditional signal formed via subtraction is also consistent with that corresponding to the peak of $f_1(n)$.

Figure 10:
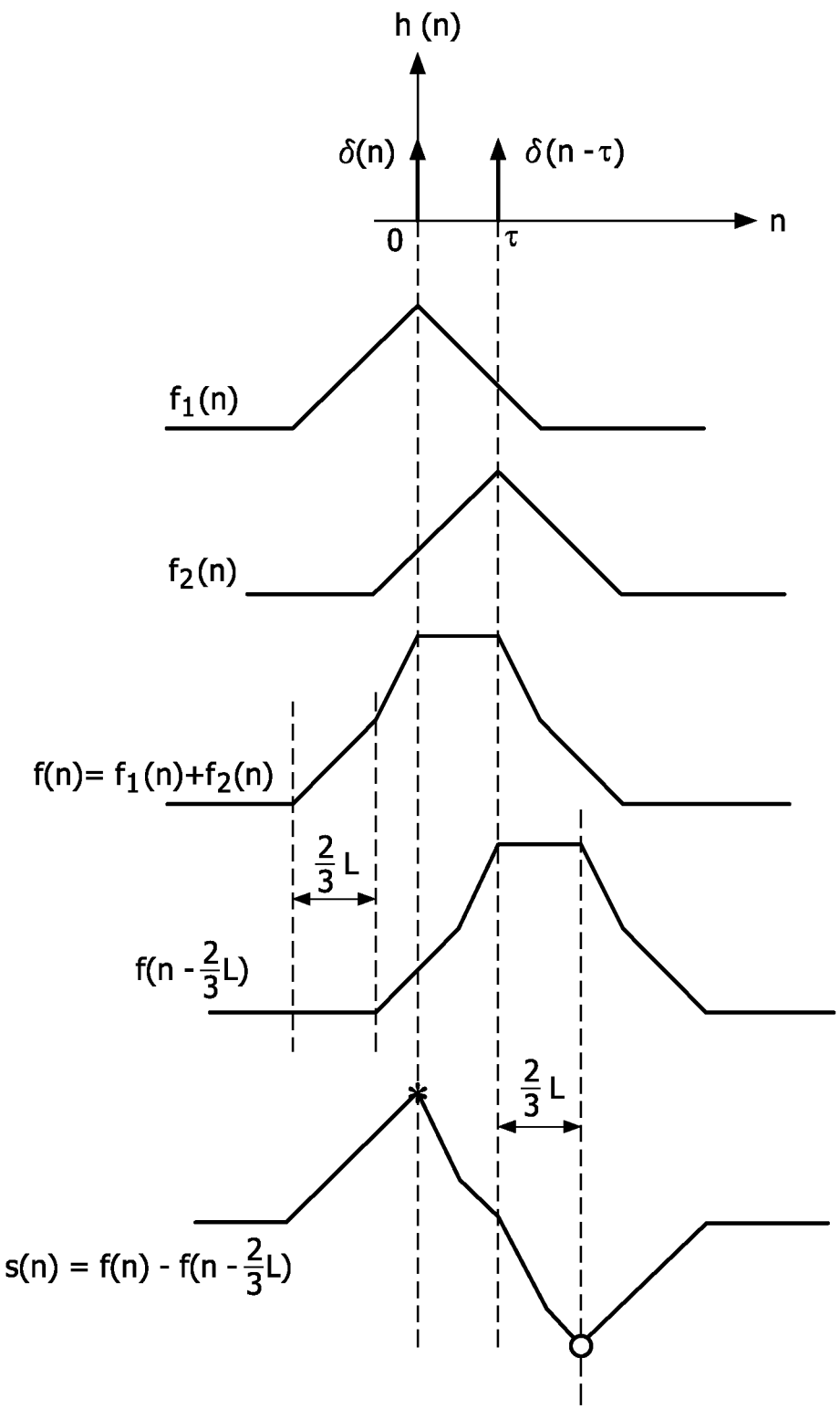
FIG. 10 shows a process for converting a first conditional signal comprising at least two local peaks into a second conditional signal comprising a global peak implemented according to another embodiment of the invention.

In the embodiment of FIG. 9, the predefined delay and the GI have equal length. But those skilled in the art will appreciate that the predefined delay is not limited to be the length L of the GI, and can be less than L as well. The predefined delay may be of any value so long as the second conditional signal has a global peak whose value exceeds a predefined threshold, which allows the subsequent detector to detect the global peak. For ease of understanding. FIG. 10 shows an embodiment in which the predefined delay $D_{delay}$ equals $\frac{2}{3}L$. It can be seen from FIG. 10 that the second conditional signal $$s(n) = f(n) - f\left(n - \frac{2}{3}L\right)$$

also has the only global peak, as indicated by the * mark. Comparison between FIG. 9 and FIG. 10 tells that the global peak in FIG. 10 is less than that in FIG. 9. Generally, the smaller the predefined delay is, the smaller the global peak will be obtained. The closer the predefined delay approaches the width of the GI, the larger the global peak will be obtained.

The method and apparatus provided in the invention is applicable to detection of symbol synchronization information, as well as estimation of the channel spread of the propagation channel. It can be seen from FIG. 9 and FIG. 10 that the second conditional signal $s(n)$ has the only global minimum as indicated by the ○ mark, in addition to the only global maximum. The instant corresponding to the global minimum is same as the instant corresponding to the ending point of the platform of the delayed first conditional signal $f(n-D_{delay})$, for example, $f(n-L)$ in FIG. 9 and $$f\left(n - \frac{2}{3}L\right)$$

in FIG. 10. The difference between the instants corresponding to the global peak and the global minimum is $\Delta = t_{min} - t_{max} = \tau + D_{delay}$, where $t_{min}$ is the instant corresponding to the global minimum and $t_{max}$ is the instant corresponding to the global peak. Since L is known, the channel spread $\tau = \Delta - D_{delay}$ may be obtained after measuring the time difference $\Delta$. When the predefined delay $D_{delay}$ is L, the channel spread is $\tau = \Delta - D_{GI} = \Delta - L$. Those skilled in the art will appreciate that the channel spread may be calculated by $\Delta = t_{max} - t_{min} = \tau + D_{delay}$ when the subtracter of the converter 530 generates the second conditional signal by subtracting the first conditional signal from the delayed first conditional signal. Accordingly, the equation for calculating the channel spread is generalized to be $\Delta = |t_{max} - t_{min}| = \tau + D_{delay}$.

Figure 11:
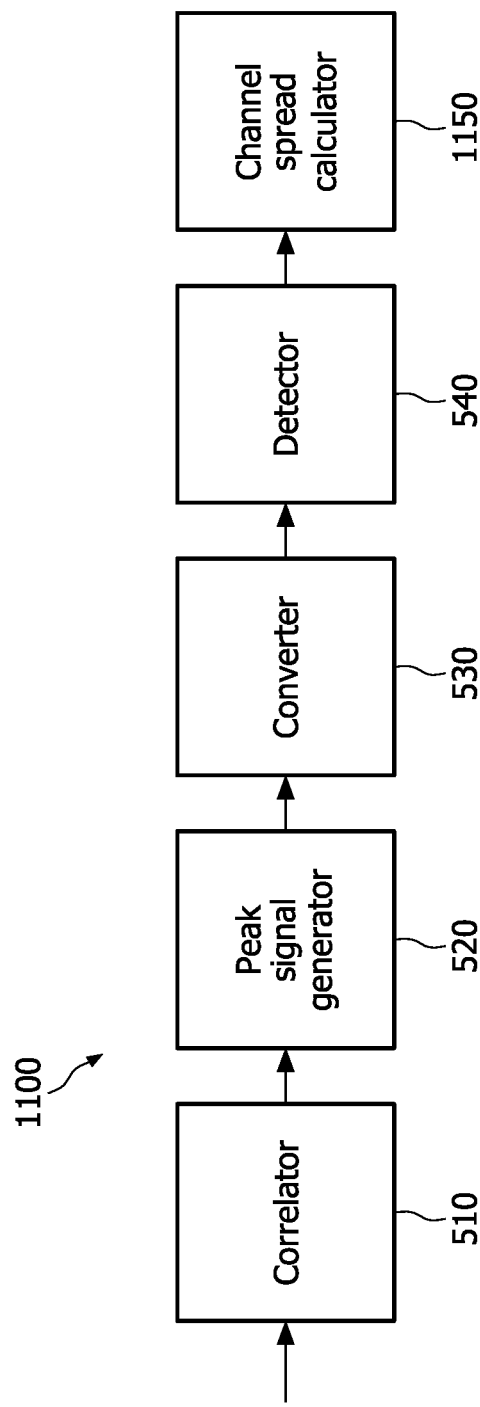
FIG. 11 is a block diagram showing a receiver implemented according to an embodiment of the invention.

FIG. 11 is a block diagram showing a receiver, which is applicable to detection of symbol synchronization information, as well as estimation of the channel spread. In addition to a correlator 510, a peak signal generator 520, a converter 530 and a detector 540, the receiver 1100 further comprises a channel spread calculator 1150 to estimate the channel spread for the channel over which the received signals are transmitted. The detector 540 detects the global peak and the global minimum, and then sends the corresponding instants $t_{min}$ and $t_{max}$ to the channel spread calculator 1150, which obtains the channel spread $\tau$ based on $\Delta = |t_{max} - t_{min}| = \tau + D_{delay}$.

Figure 12A:
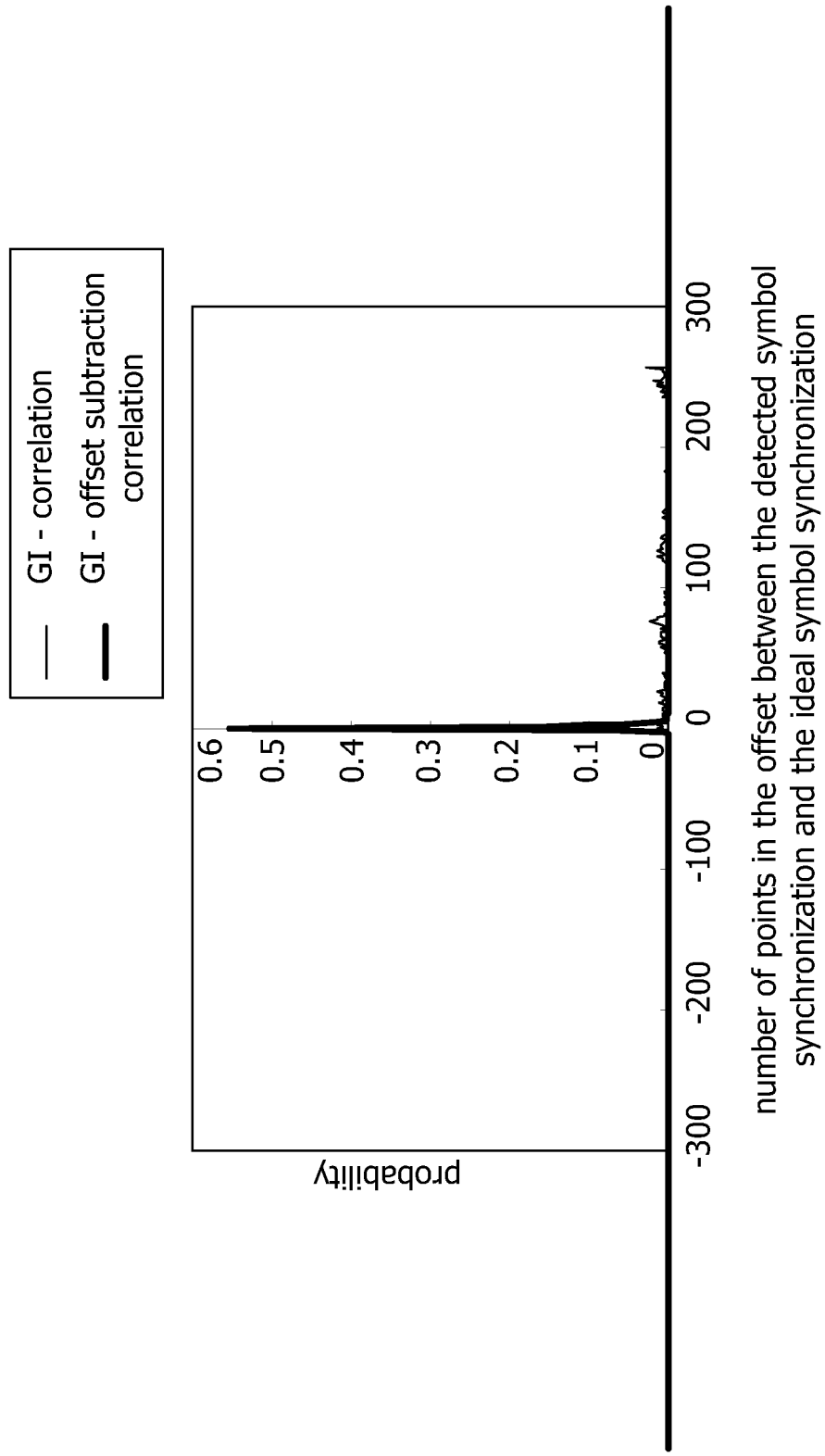
FIG. 12A is a diagram schematically illustrating the simulation results of detecting symbol synchronization with different methods in a case where the channel spread equals $0.5*D_{GI}$.
Figure 12B:
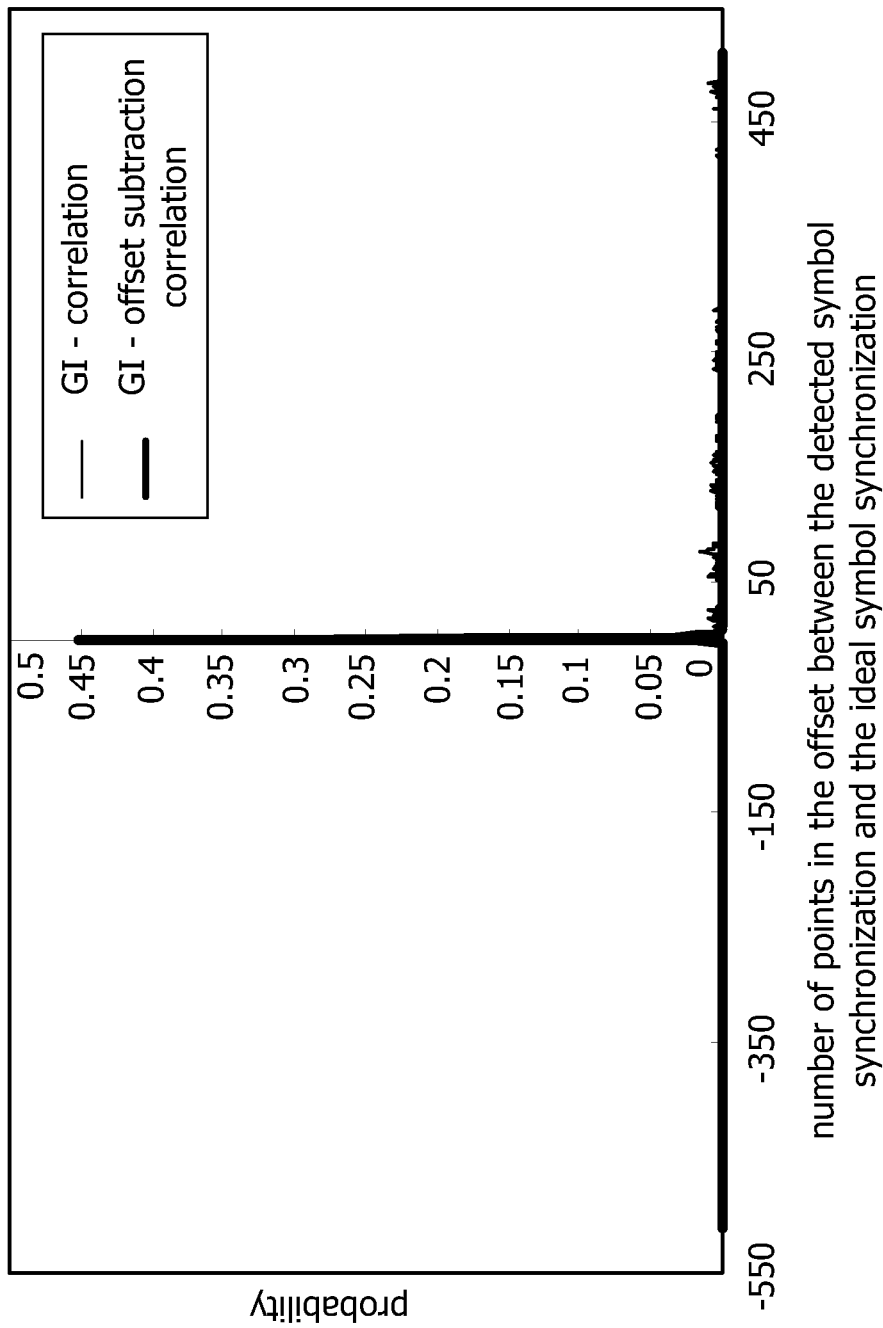
FIG. 12B is a diagram schematically illustrating the simulation results of detecting symbol synchronization with different methods in a case where the channel spread equals $0.95*D_{GI}$.

To test the performances for the method provided in various embodiments of the invention, simulations are made to compare the performances for detection of symbol synchronization in cases where the channel have different channel spread, with regard to the method of the invention (GI-offset subtraction correlation) and the method of correlation based on GI as proposed by J-J. van De Beek et al (GI-correlation). The simulation model is a DVB-T system using 2048 points IFFT/FFT, the channel is an SFN channel having 0-DB echo and the channel noise is Gaussian noise. In FIG. 12A and FIG. 12B, the horizontal axis indicates the number of points in the offset between the symbol synchronization detected with the different methods and the ideal symbol synchronization, and the vertical axis indicates the probability for the occurrence of the offset.

In the example of FIG. 12A, the channel spread $\tau=0.5*D_{GI}$. It can be seen that the symbol synchronization point can hardly be detected with the GI correlation method. With the GI-offset subtraction method, however, the detected symbol synchronization point has a perfect match with the real symbol synchronization point at a probability more than 55%, that is, the probability for Offset=0 is more than 55%.

In the example of FIG. 12B, the channel spread $\tau=0.95*D_{GI}$. It can be seen that the symbol synchronization point can hardly be detected with the GI correlation method. With the GI-offset subtraction method, however, the detected symbol synchronization point has a perfect match with the real symbol synchronization point at a probability more than 45%.

It can be seen that the method and apparatus provided in various embodiments of the invention may substantially improve the precision for detection of symbol synchronization information for an OFDM signal based on GI, regardless of the channel spread for the propagation channel.

It is to be understood by those skilled in the art that various improvements and modifications may be made to the method and apparatus provided in the invention without departing from the basis of the invention, the scope of which is to be defined by the attached claims herein.

The invention claimed is:

1. An apparatus for determining symbol synchronization information for an OFDM (Orthogonal Frequency Division Multiplexing) signal, the OFDM signal comprising at least an OFDM symbol and a GI (Guard Interval) corresponding to the OFDM symbol, the apparatus comprising:
   a correlator, configured to generate a correlation signal based on each OFDM symbol and its corresponding GI;
   a peak signal generator, configured to process the correlation signal to generate a first conditional signal comprising at least two local peaks; a
   a converter, configured to convert the first conditional signal into a second conditional signal comprising a global peak, wherein the converter comprises: a delayer, configured to delay the first conditional signal by a predefined delay; and a subtracter, configured to subtract the delayed first conditional signal from the first conditional signal to generate the second conditional signal; and
   a detector, configured to detect the global peak to obtain the symbol synchronization information corresponding to the global peak.

2. The apparatus as claimed in claim 1, wherein the predefined delay has such a length that the corresponding global peak is not less than a predefined threshold, so as to allow the detector to detect the global peak.

3. The apparatus as claimed in claim 2, wherein length of the predefined delay and length of the GI satisfy a preset length relationship.

4. The apparatus as claimed in claim 3, wherein the predefined delay and the GI have equal length.

5. The apparatus as claimed in claim 1, wherein the second conditional signal further includes a global minimum and the detector is further configured to detect the global minimum, the apparatus further comprising: a channel spread calculator, configured to subtract the length of the predefined delay from the time interval between the global peak and the global minimum, so as to calculate the channel spread for a corresponding channel.

6. The apparatus as claimed in claim 1, wherein the peak signal generator comprises: an argument calculator, configured to calculate the argument of the correlation signal.

7. The apparatus as claimed in claim 6, wherein the peak signal generator further comprises: a moving sum unit, configured to perform moving sum on one of the correlation signal and a signal output from the argument calculator, to generate a moving sum conditional signal; and an absolute value calculator, configured to calculate the absolute value for the real component of each sample of the moving sum conditional signal, to obtain the first conditional signal.

8. An OFDM receiver, comprising: an RF front-end, configured to process a received OFDM RF signal into an OFDM baseband signal, wherein the OFDM baseband signal comprises at least an OFDM symbol and a GI (Guard Interval) corresponding to the OFDM symbol; and a symbol synchronization estimator, configured to estimate symbol synchronization information from the OFDM baseband signal, the symbol synchronization estimator comprising: a correlator, configured to generate a correlation signal based on each of the OFDM symbols and its corresponding GI;
   a peak signal generator, configured to process the correlation signal to generate a first conditional signal comprising at least two local peaks; a converter, configured to convert the first conditional signal into a second conditional signal comprising a global peak; and a detector, configured to detect the global peak to obtain the symbol synchronization information corresponding to the global peak, and
   wherein the converter comprises: a delayer, configured to delay the first conditional signal by a predefined delay; and a subtracter, configured to subtract the delayed first conditional signal from the first conditional signal to generate the second conditional signal.

9. A method for determining symbol synchronization information for an OFDM (Orthogonal Frequency Division Multiplexing) signal, the OFDM signal comprising at least an OFDM symbol and a GI (Guard Interval) corresponding to the OFDM symbol, the method comprising:
   a) generating a correlation signal based on each OFDM symbol and its corresponding GI;
   b) processing the correlation signal to generate a first conditional signal comprising at least two local peaks;
   c) converting the first conditional signal into a second conditional signal comprising a global peak; and
   d) detecting the global peak to obtain the symbol synchronization information corresponding to the global peak
   wherein the step c) further comprises:
      delaying the first conditional signal by a predefined delay; and
      generating the second conditional signal by subtracting the delayed first conditional signal from the first conditional signal.

10. The method as claimed in claim 9, wherein the predefined delay and the GI have equal length.

11. The method as claimed in claim 9, further comprising:
   e) detecting a global minimum from the second conditional signal; and f) subtracting the length of the predefined delay from the time interval between the global peak and the global minimum, so as to calculate the channel spread for a corresponding channel.

12. The method as claimed in claim 9, wherein the step b) further comprises:
   I) performing moving sum on the correlation signal, to generate a moving sum conditional signal, wherein the moving sum conditional signal represents accumulation of amplitudes for the correlation signal; and II) calculating the absolute value for the real component of each sample of the moving sum conditional signal, to obtain the first conditional signal.

13. The method as claimed in claim 9, wherein the step b) further comprises:
   I) calculating an argument for each sample of the correlation signal, to generate an argument conditional signal;
   II) performing moving sum on the argument conditional signal, to generate a moving sum conditional signal, wherein the moving sum conditional signal represents accumulation of arguments for the correlation signal; and
   III) calculating the absolute value for the real component of each sample of the moving sum conditional signal, to obtain the first conditional signal.

14. The method as claimed in claim 9, wherein the step a) further comprises:
   I) delaying the OFDM symbol and the GI;
   II) calculating a conjugate signal for the delayed OFDM symbol and GI; and
   III) correlating the OFDM symbol and the GI with the conjugate signal, to generate the correlation signal.

15. The method as claimed in claim 9, wherein the step a) further comprises:
   I) delaying the OFDM symbol and the GI;
   II) calculating a conjugate signal for the OFDM symbol and the GI; and
   III) correlating the delayed OFDM symbol and the delayed GI with the conjugate signal, to generate the correlation signal.

16. An apparatus for determining symbol synchronization information for an OFDM (Orthogonal Frequency Division Multiplexing) signal, the OFDM signal comprising at least an OFDM symbol and a GI (Guard Interval) corresponding to the OFDM symbol, the apparatus comprising:
   a correlator, configured to generate a correlation signal based on each OFDM symbol and its corresponding GI;
   a peak signal generator, configured to process the correlation signal to generate a first conditional signal comprising at least two local peaks; a
   a converter, configured to convert the first conditional signal into a second conditional signal comprising a global peak, wherein the instant corresponding to the global peak is the same as the instant corresponding to the first conditional signal; and
   a detector, configured to detect the global peak to obtain the symbol synchronization information corresponding to the global peak.

17. The apparatus as claimed in claim 16, wherein the predefined delay has such a length that the corresponding global peak is not less than a predefined threshold, so as to allow the detector to detect the global peak.

18. The apparatus as claimed in claim 17, wherein length of the predefined delay and length of the GI satisfy a preset length relationship.

19. The apparatus as claimed in claim 18, wherein the predefined delay and the GI have equal length.

20. The apparatus as claimed in claim 16, wherein the second conditional signal further includes a global minimum and the detector is further configured to detect the global minimum, the apparatus further comprising: a channel spread calculator, configured to subtract the length of the predefined delay from the time interval between the global peak and the global minimum, so as to calculate the channel spread for a corresponding channel.

21. The apparatus as claimed in claim 16, wherein the peak signal generator comprises: an argument calculator, configured to calculate the argument of the correlation signal.

22. The apparatus as claimed in claim 21, wherein the peak signal generator further comprises: a moving sum unit, configured to perform moving sum on one of the correlation signal and a signal output from the argument calculator, to generate a moving sum conditional signal; and an absolute value calculator, configured to calculate the absolute value for the real component of each sample of the moving sum conditional signal, to obtain the first conditional signal.

23. An OFDM receiver, comprising: an RF front-end, configured to process a received OFDM RF signal into an OFDM baseband signal, wherein the OFDM baseband signal comprises at least an OFDM symbol and a GI (Guard Interval) corresponding to the OFDM symbol; and a symbol synchronization estimator, configured to estimate symbol synchronization information from the OFDM baseband signal, the symbol synchronization estimator comprising: a correlator, configured to generate a correlation signal based on each of the OFDM symbols and its corresponding GI;
   a peak signal generator, configured to process the correlation signal to generate a first conditional signal comprising at least two local peaks; a converter, configured to convert the first conditional signal into a second conditional signal comprising a global peak; and a detector, configured to detect the global peak to obtain the symbol synchronization information corresponding to the global peak, and
   wherein the instant corresponding to the global peak is the same as the instant corresponding to the first conditional signal.

* * * * *